(12) United States Patent
Ikeda

(10) Patent No.: US 9,891,502 B2
(45) Date of Patent: Feb. 13, 2018

(54) IMAGE CAPTURING APPARATUS FOR GENERATING A HIGH DYNAMIC RANGE VIDEO FRAME FROM MULTIPLE IMAGE FRAMES WITH DIFFERENT CHARACTERISTICS

(71) Applicant: CANON KABUSHIKI KAISHA, Tokyo (JP)

(72) Inventor: Hitoshi Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 15/021,249

(22) PCT Filed: Sep. 10, 2014

(86) PCT No.: PCT/JP2014/074609
§ 371 (c)(1),
(2) Date: Mar. 10, 2016

(87) PCT Pub. No.: WO2015/037742
PCT Pub. Date: Mar. 19, 2015

(65) Prior Publication Data
US 2016/0227092 A1    Aug. 4, 2016

(30) Foreign Application Priority Data

Sep. 12, 2013  (JP) ................................ 2013-189847

(51) Int. Cl.
*H04N 5/225* (2006.01)
*G03B 7/00* (2014.01)
(Continued)

(52) U.S. Cl.
CPC ............. *G03B 7/00* (2013.01); *H04N 5/2354* (2013.01); *H04N 5/2355* (2013.01);
(Continued)

(58) Field of Classification Search
CPC . H04N 5/2355; H04N 5/35581; H04N 5/2356
See application file for complete search history.

(56) References Cited

U.S. PATENT DOCUMENTS

2011/0261217 A1  10/2011  Muukki et al.
2012/0249844 A1*  10/2012  Saito .................... H04N 5/2355
                                                                         348/242

(Continued)

FOREIGN PATENT DOCUMENTS

EP    2629503 A2    8/2013
JP    07-097841 B   10/1995
(Continued)

OTHER PUBLICATIONS

Dec. 15, 2016 Korean Office Action, without an English Translation, that issued in Korean Patent Application No. 10-2016-7009184.
(Continued)

*Primary Examiner* — Gary C Vieaux
(74) *Attorney, Agent, or Firm* — Cowan, Liebowitz & Latman, P.C.

(57) ABSTRACT

An image capturing apparatus is provided capable of recording an appropriate HDR still image when shooting a still image during HDR video recording. An HDR video frame having a high dynamic range is generated by generating video frames from frames of different exposure conditions and composing the video frames, and the HDR video frame is recorded in a recording medium as an HDR video. When a still image shooting instruction is accepted during the generation of the HDR video frame, an HDR still image frame having a high dynamic range is generated by generating still image frames of different exposure conditions during the generation of the HDR video frame and composing the still image frames, and the HDR still image frame is recorded in the recording medium as an HDR still image.

16 Claims, 12 Drawing Sheets

(51) Int. Cl.
*H04N 5/77* (2006.01)
*H04N 9/804* (2006.01)
*H04N 5/235* (2006.01)
*H04N 19/00* (2014.01)
*H04N 5/355* (2011.01)

(52) U.S. Cl.
CPC ....... *H04N 5/2356* (2013.01); *H04N 5/35581* (2013.01); *H04N 5/772* (2013.01); *H04N 9/8042* (2013.01); *H04N 19/00* (2013.01)

(56) References Cited

U.S. PATENT DOCUMENTS

| | | | |
|---|---|---|---|
| 2013/0021447 A1* | 1/2013 | Brisedoux | H04N 5/2258 348/47 |
| 2013/0216199 A1 | 8/2013 | Nakajima | |
| 2013/0321659 A1* | 12/2013 | Kunishige | H04N 5/232 348/220.1 |

FOREIGN PATENT DOCUMENTS

| | | |
|---|---|---|
| JP | 2005-057378 A | 3/2005 |
| JP | 2011-211620 A | 10/2011 |
| JP | 2012-044714 A | 3/2012 |
| JP | 2012-050073 A | 3/2012 |
| JP | 2012-205244 A | 10/2012 |
| KR | 10-0790160 B1 | 1/2008 |
| KR | 10-1193414 B1 | 10/2012 |
| RU | 2422866 C2 | 6/2011 |

OTHER PUBLICATIONS

Jul. 21, 2017 Russian Office Action, with an English Translation, that issued in Russian Patent Application No. 2016113690.
International Search Report of International Application No. PCT/US2014/074609 dated Nov. 18, 2014.
European Search Report dated Mar. 28, 2017, that issued in the corresponding European Patent Application No. 14844407.8.

* cited by examiner

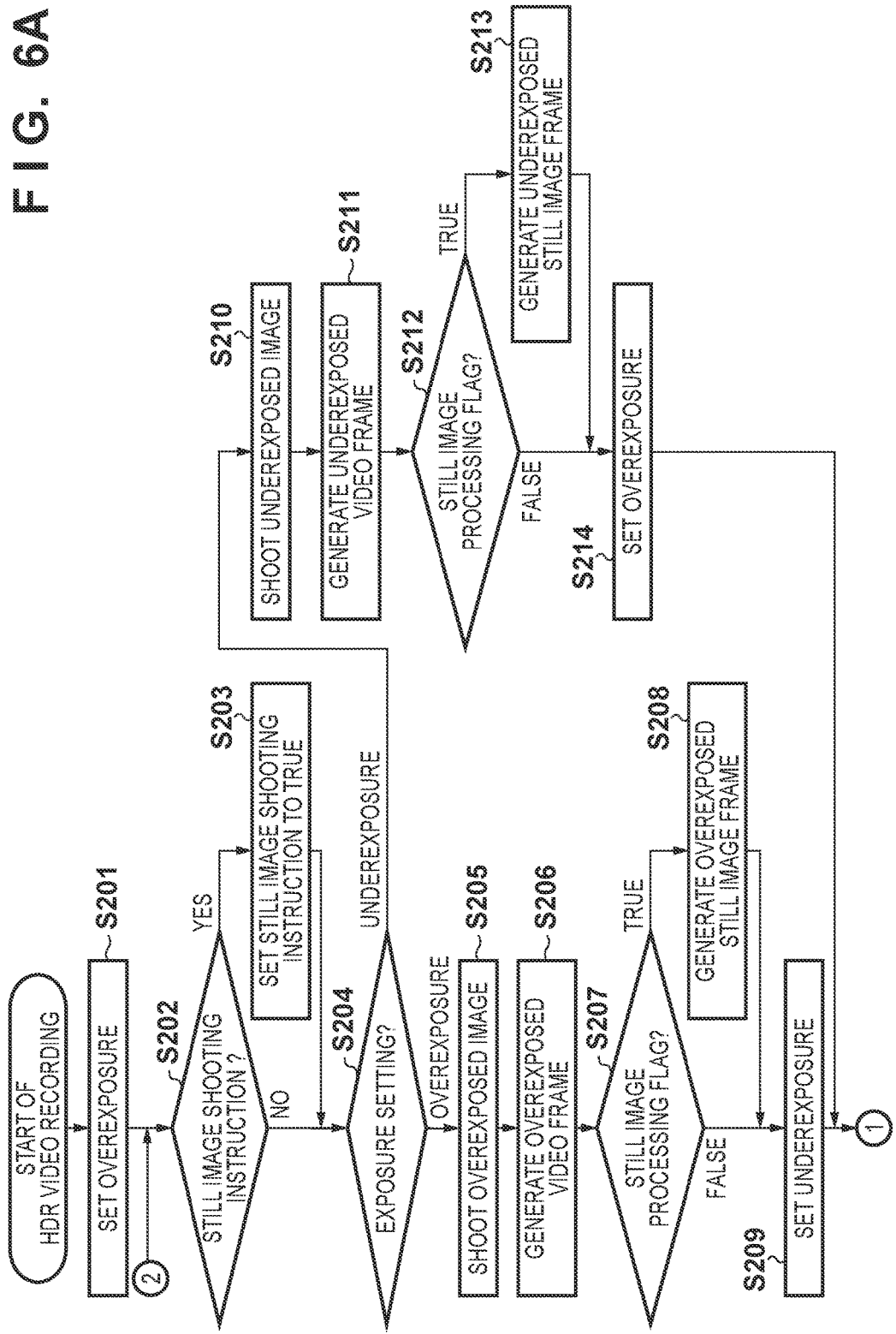

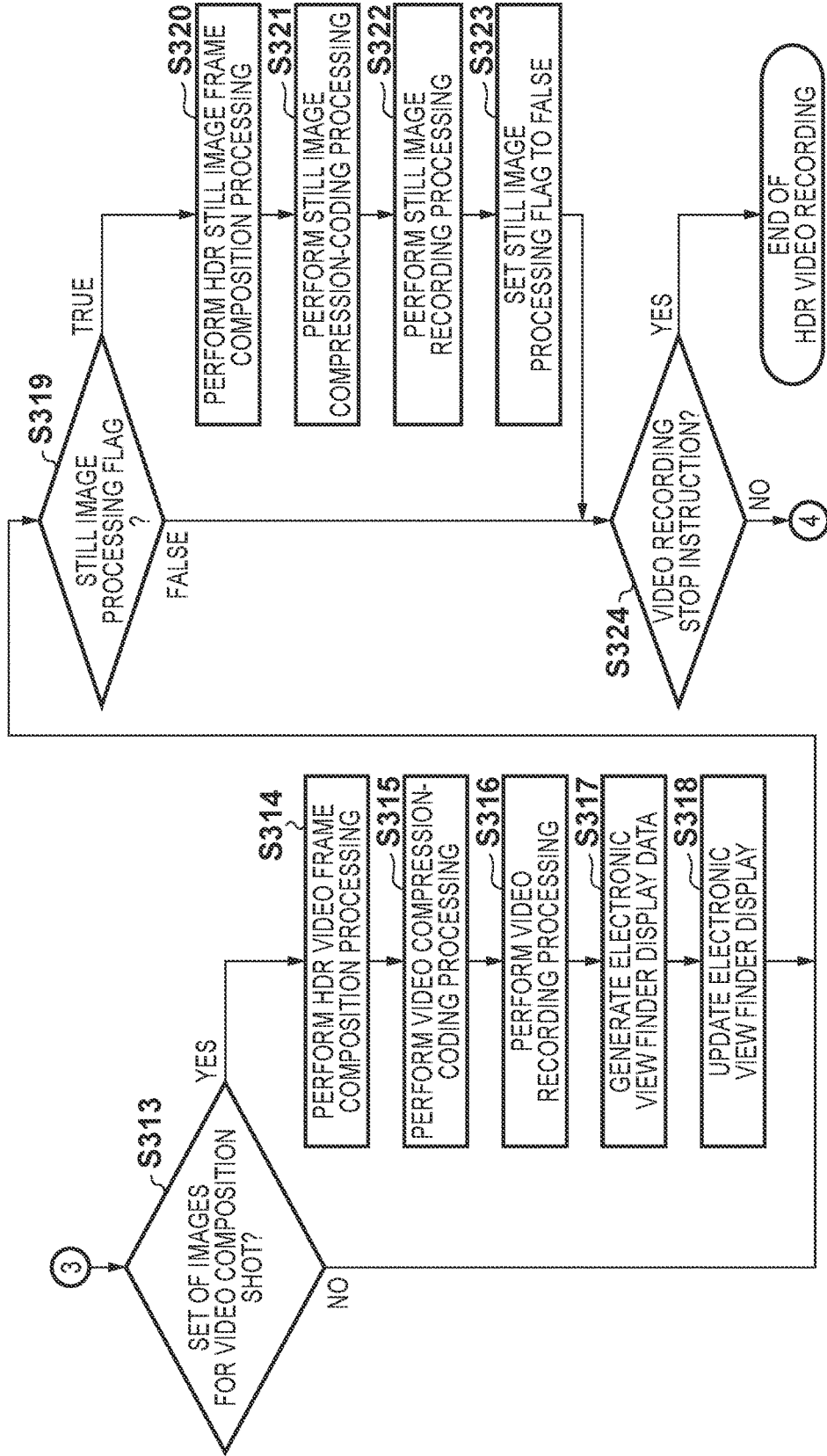

IMAGE CAPTURING APPARATUS FOR GENERATING A HIGH DYNAMIC RANGE VIDEO FRAME FROM MULTIPLE IMAGE FRAMES WITH DIFFERENT CHARACTERISTICS

CROSS-REFERENCE TO RELATED APPLICATIONS

This application claims priority to International Application No. PCT/JP2014/074609 filed on Sep. 10, 2014, the entire disclosure of which is hereby incorporated by reference.

TECHNICAL FIELD

The present invention relates to an image capturing apparatus and a method of controlling the same.

BACKGROUND ART

Many of recent image capturing apparatuses such as a digital camera are capable of not only still image shooting but also shooting and recording of a video with sound. Shooting in various modes can be performed by one digital camera. In recent times, there also exist an image capturing apparatus capable of shooting a still image while shooting a video with sound and an image capturing apparatus capable of recording a scene that has previously been unattainable by composing a plurality of continuously captured images.

An image capturing apparatus disclosed in Japanese Patent Laid-Open No. 2005-57378 thins out a series of image data obtained by driving an image sensor in a progressive scanning mode into the video recording pixel count, and processes and records the image data as a video. If the user instructs to shoot a still image during video shooting, the image data is processed and recorded as a still image without being thinned out. According to this technique, it is possible to shoot a high-quality still image during video shooting without interrupting video shooting and also shoot the video without lowering the frame rate.

Japanese Patent Publication No. 7-97841 discloses an image capturing apparatus capable of obtaining a video having a wide dynamic range by composing a plurality of images captured under different exposure amounts by periodically changing the exposure time. According to this technique, the images are continuously captured while alternately changing the exposure time to long and short durations and composed, thereby generating a high dynamic range video (to be referred to as an "HDR video" hereinafter).

Conventionally, however, no detailed processing method has been examined for a case where a still image shooting instruction is input to record an HDR still image during HDR video recording. The timing of still image shooting instruction input is asynchronous to continuous image capturing processing for video recording. For this reason, as for which frame is to be used to generate an HDR video or HDR still image, a wide range of variations can be considered in accordance with required performance.

SUMMARY OF INVENTION

The present invention provides an image capturing apparatus capable of recording an appropriate HDR still image when shooting a still image during HDR video recording whose dynamic range is expanded by composing a plurality of images of different exposures.

According to one aspect of the present invention, an image capturing apparatus comprises first recording control means for performing processing of generating an HDR video frame having a high dynamic range by generating idea frames from a plurality of frames of different exposure conditions and composing the video frames, and recording the HDR video frames in a recording medium as an HDR video, accepting means for accepting a still image shooting instruction during the processing by the first recording control means, and a second recording control means for, when the accepting means accepts the still image shooting instruction during the processing by the first recording control means, generating an HDR still image frame having a high dynamic range by generating a plurality of still image frames of different exposure conditions during the processing by the first recording control means and composing the still image frames, and recording the HDR still image frame in a recording medium as an HDR still image.

Further features of the present invention will become apparent from the following description of exemplary embodiments (with reference to the attached drawings).

BRIEF DESCRIPTION OF DRAWINGS

FIGS. 6A to 6B are operation flowcharts of the image capturing apparatus according to the embodiment;

FIGS. 8A to 8B are operation flowcharts of the image capturing apparatus according to the embodiment;

DESCRIPTION OF EMBODIMENTS

Various exemplary embodiments, features, and aspects of the invention will be described in detail below with reference to the drawings.

Preferred embodiments of the present invention will now be described in detail with reference to the accompanying drawings. Note that the following embodiments are not intended to limit the present invention and only show detailed examples advantageous for implementing the present invention. In addition, not all the combinations of features described in the following embodiments are essential to the solving means of the present invention.

Figure 1:
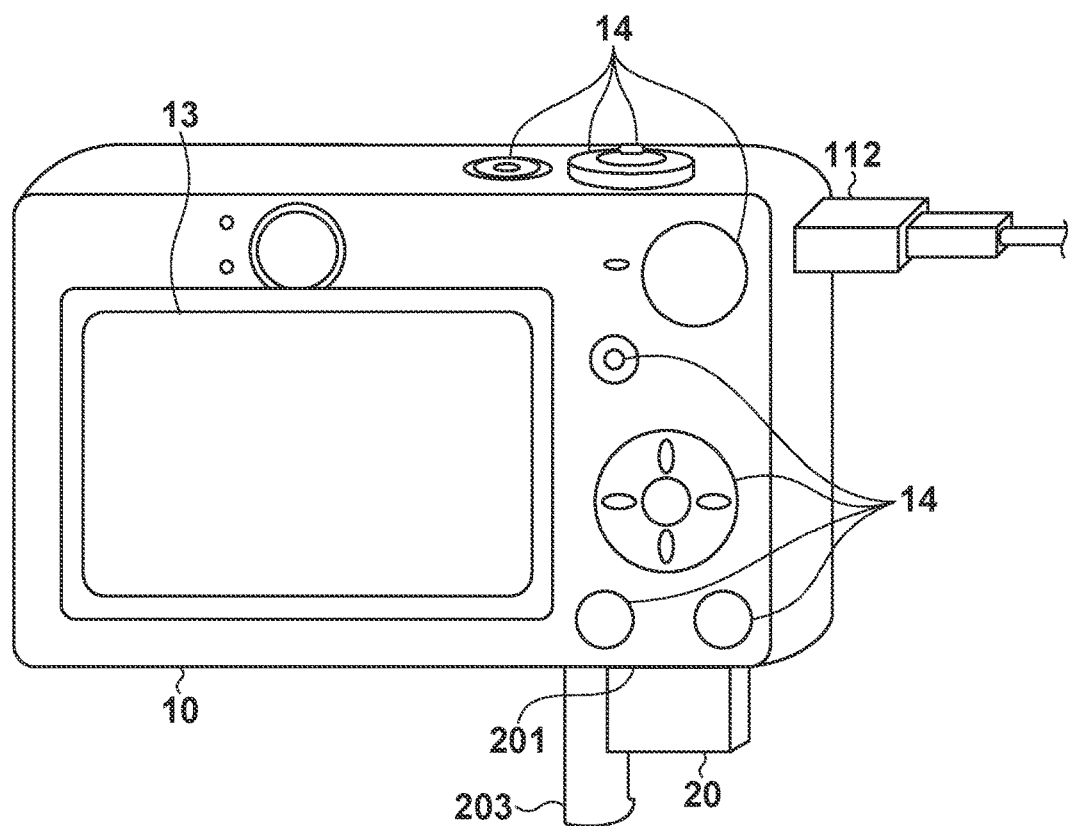
FIG. 1 is a view showing the outer appearance of an image capturing apparatus according to an embodiment.
Figure 2:
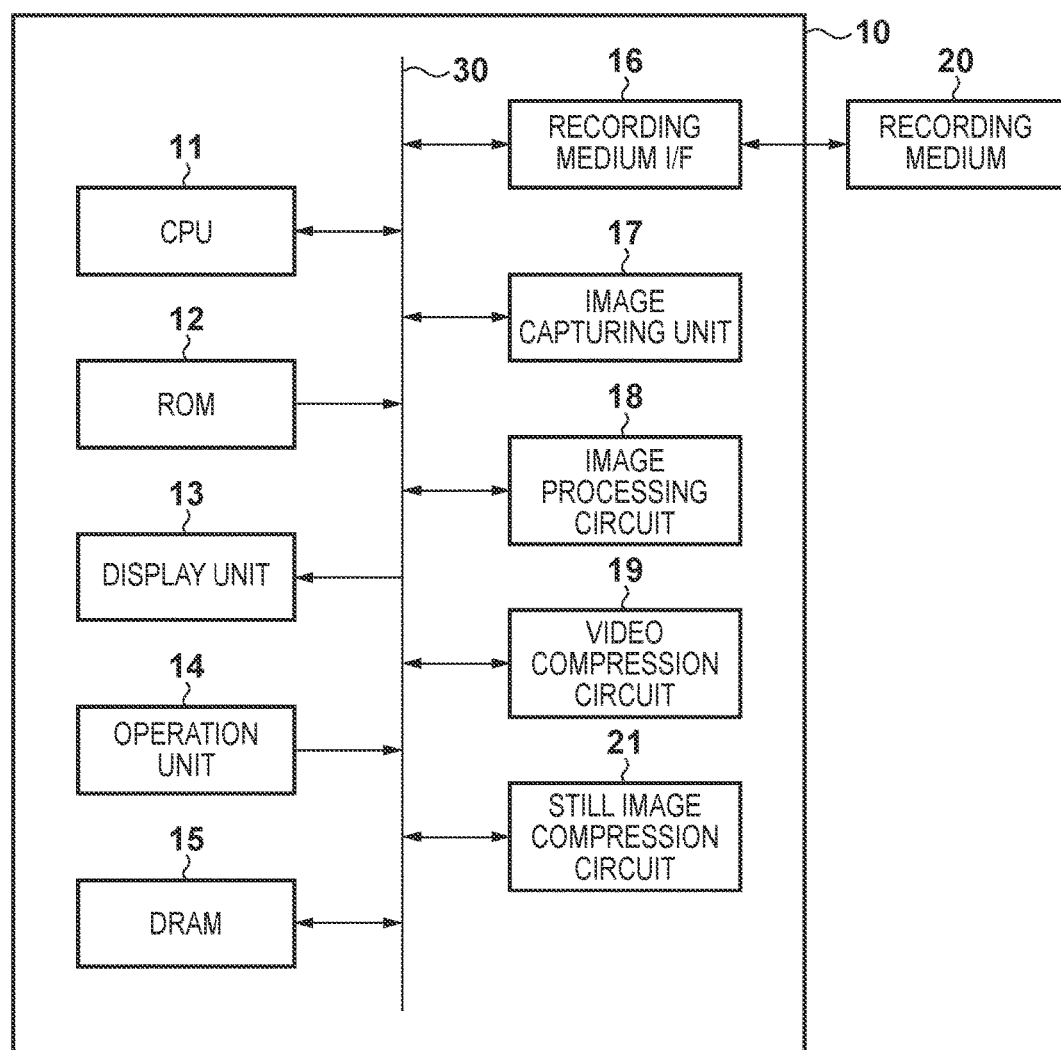
FIG. 2 is a block diagram showing the schematic arrangement of the image capturing apparatus according to the embodiment.

FIG. 1 is a view showing the outer appearance of an image capturing apparatus 10 according to this embodiment. FIG. 2 is a block diagram showing the schematic arrangement. A connector 112 connects a connection cable and the image capturing apparatus 10. A recording medium 20 is a recording medium such as a memory card or a hard disk. A recording medium slot 201 is a slot configured to store the recording medium 20. The recording medium 20 stored in the recording medium slot 201 can communicate with the image capturing apparatus 10. A cover 203 is the cover of the recording medium slot 201.

A CPU (Central Processing Unit) 11 controls each processing unit and data flow (to be described later). A ROM 12 stores programs (firmware) related to the processing procedure of the CPU 11 and various kinds of information. A display unit 13 is formed from a color liquid crystal display or the like and used to display an image and a graphical user interface. The display unit 13 also has a terminal that outputs a video signal to an external display device such as a TV. An operation unit 14 is formed from a release switch SW1/SW2, a video recording button, various kinds of buttons, a 4-way selector, a control wheel, a dial switch, and the like which accept instructions from the user.

A DRAM 15 is used as the work area of the CPU 11, and has a buffer function of temporarily storing image data, display data, data after image decompression, and the like. Data write/read in/from the DRAM is normally performed via a memory controller which is not illustrated here. Although not illustrated, a DMA controller that performs DMA transfer for the CPU 11 without intervening read/write is provided between the DRAM 15 and each processing unit.

A recording medium interface 16 performs image data write/read in/from the recording medium 20 in accordance with an instruction from the CPU 11. The recording medium 20 is formed from a randomly accessible recording medium such as a memory card, an optical disk, or a hard disk and is detachably attached to the image capturing apparatus 10. An image capturing unit 17 is formed from a lens, a stop, a shutter, and an image sensor such as a CCD sensor or a CMOS sensor, and captures an object. An image processing circuit 18 generates YUV data by performing image processing for image data input from the image capturing unit 17, resizes the YUV data to an arbitrary size, and performs rotation and color conversion. The image processing circuit 18 can also compose a plurality of image data or YUV data input from the image capturing unit 17 and generate one image data or YUV data. A video compression circuit 19 compression-codes YUV data into video data of H.264 or H.265 format, or the like. A still image compression circuit 21 compression-codes the YUV data into still image of JPEG format or the like. The CPU 11, the ROM 12, the display unit 13, the operation unit 14, the DRAM 15, the recording medium I/F 16, the image capturing unit 17, the image processing circuit 18, the video compression circuit 19, and the still image compression circuit 21 communicate via an internal bus 30.

First Embodiment

An image capturing apparatus 10 can generate and record a high dynamic range video (to be referred to as an "HDR video" hereinafter) by composing a plurality of image frames obtained by continuously performing image capturing while changing the exposure condition (for example, exposure time). Upon accepting a still image shooting instruction by an operation of an operation unit 14 during HDR video recording, the image capturing apparatus 10 can also shoot a high dynamic range still image (to be referred to as an "HDR still image" hereinafter) by composing a plurality of image frames continuously captured while changing the exposure time and continuing the HDR video recording.

Figure 3:
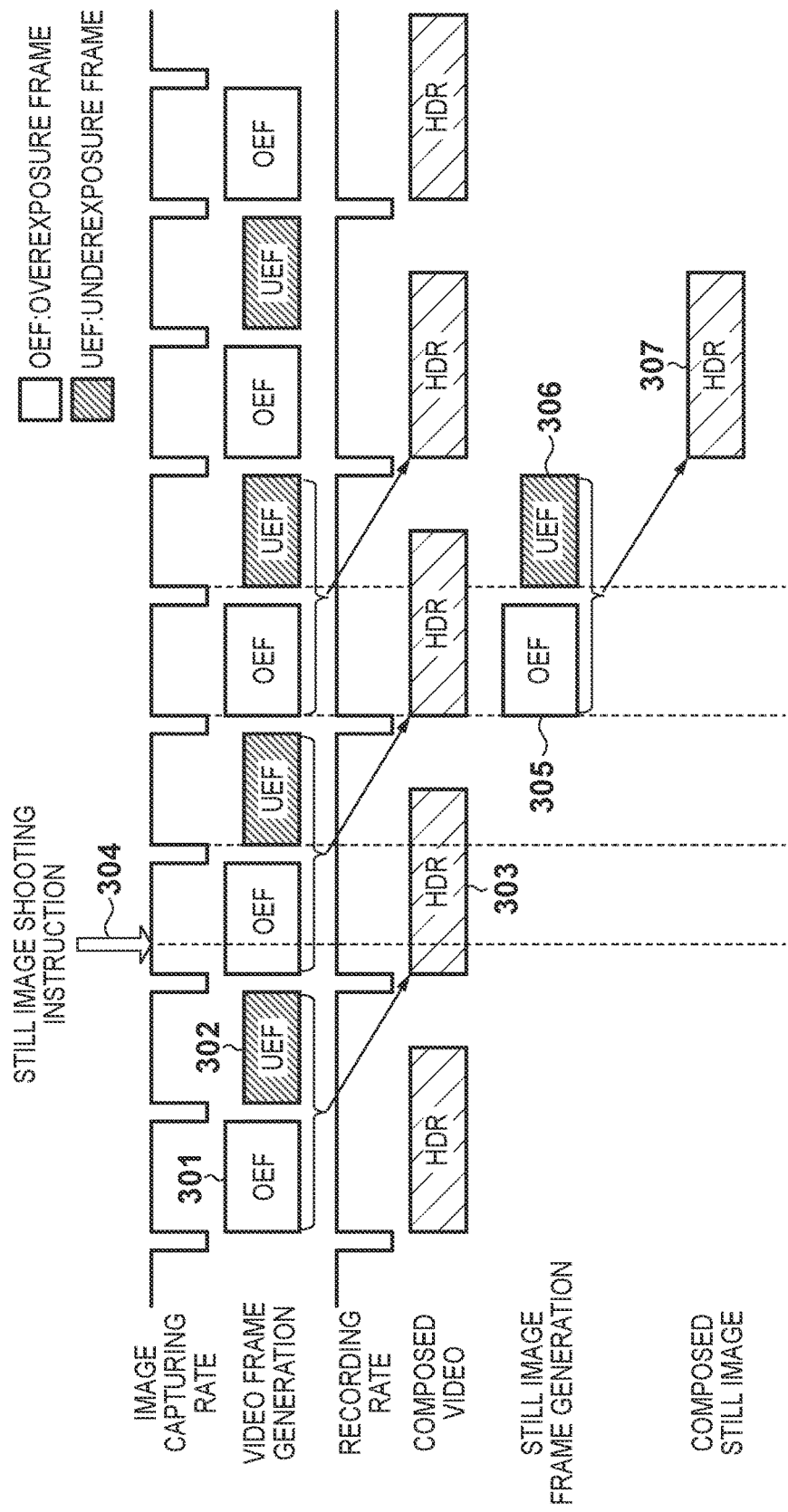
FIG. 3 is an operation timing chart of an image capturing apparatus according to an embodiment.

FIG. 3 shows an example of the operation timing of the image capturing apparatus 10. An image capturing unit 17 performs image capturing while alternately changing the exposure condition (for example, exposure time). An image processing circuit 18 repetitively generates an overexposed video frame 301 captured under a first exposure condition and an underexposed video frame 302 captured under a second exposure condition. When a set of overexposed and underexposed video frames is obtained, the image processing circuit 18 composes the overexposed and underexposed video frames and generates an HDR video frame 303 having a high dynamic range. A video compression circuit 19 compression-codes the continuous HDR video frames and records them in a recording medium 20 as an HDR video.

Upon accepting a still image shooting instruction 304 by an operation of the operation unit 14 during the HDR video recording, the image processing circuit 18 performs the following processing. That is, the image processing circuit 18 generates a set of an overexposed still image frame 305 and an underexposed still image frame 306 closest from the still image shooting instruction 304 while generating video frames. When a set of overexposed and underexposed still image frames is obtained, the image processing circuit 18 composes the overexposed and underexposed still image frames and generates an HDR still image frame 307 having an expanded dynamic range. A still image compression circuit 21 compression-codes the HDR still image frame and records it in the recording medium 20 as an HDR still image.

Figure 4:
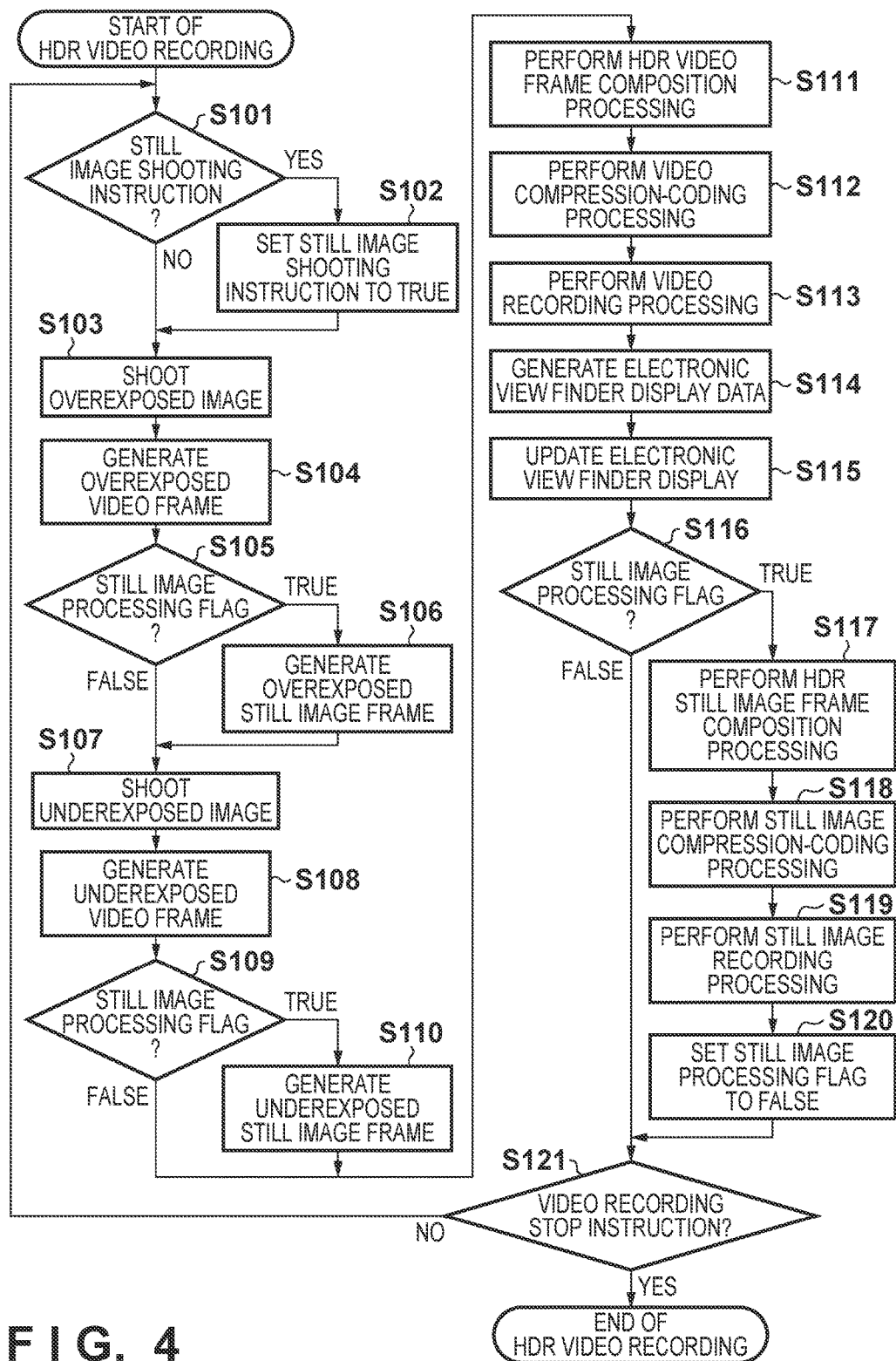
FIG. 4 is an operation flowchart of the image capturing apparatus according to the embodiment.

FIG. 4 shows the operation flowchart of the image capturing apparatus 10. A CPU 11 controls the units so as to implement the operation shown in FIG. 4. When an HDR video recording start instruction is input by pressing the video recording button of the operation unit 14, the sequence shown in FIG. 4 starts. In step S101, the CPU 11 determines whether the user has input a still image shooting instruction by operating a release switch SW2 of the operation unit 14 during HDR video recording. Upon determining that no still image shooting instruction is input, the process directly advances to step S103. Upon determining that the still image shooting instruction is input, the CPU 11 sets a still image processing flag to TRUE (for example, 1) and stores it in a DRAM 15 in step S102. The still image processing flag is used to determine whether to perform still image processing in the subsequent sequence. In step S103, the CPU 11 causes the image capturing unit 17 to shoot an overexposed image as compared to proper exposure. In step S104, the CPU 11 performs, using the image processing circuit 18, conversion processing to YUV data, resize processing to the video recording size, and the like for the overexposed image shot in step S103, generates an overexposed video frame, and stores it in the DRAM 15.

In step S105, the CPU 11 determines whether the still image processing flag stored in the DRAM 15 is set to TRUE. Upon determining that the still image processing flag is not set to TRUE, the process advances to step S107. Upon determining that the still image processing flag is set to TRUE, the process advances to step S106. In step S106, the CPU 11 performs, using the image processing circuit 18, conversion processing to YUV data and the like for the overexposed image shot in step S103, generates an overexposed still image frame, and stores it in the DRAM 15.

In step S107, the CPU 11 causes the image capturing unit 17 to shoot an underexposed image as compared to proper exposure. In step S108, the CPU 11 performs, using the image processing circuit 18, conversion processing to YUV data, resize processing to the video recording size, and the like for the underexposed image shot in step S107, generates an underexposed video frame, and stores it in the DRAM 15.

In step S109, the CPU 11 determines whether the still image processing flag stored in the DRAM 15 is set to TRUE. Upon determining that the still image processing flag is not set to TRUE, the process advances to step S111. Upon determining that the still image processing flag is set to TRUE, the process advances to step S110. In step S110, the CPU 11 performs, using the image processing circuit 18, conversion processing to YUV data and the like for the underexposed image shot in step S107, generates an underexposed still image frame, and stores it in the DRAM 15.

In step S111, the CPU 11 reads out the overexposed and underexposed video frames stored in the DRAM 15 in steps S104 and S108 and composes them using the image processing circuit 18, thereby generating an HDR video frame having a high dynamic range. In step S112, the CPU 11 compression-codes the HDR video frame generated in step S111 into video data of H.264 format or the like using the video compression circuit 19. In step S113, the CPU 11 records the video data compression-coded in step S112 in the recording medium 20 via a recording medium interface 16. In step S114, the CPU 11 performs, using the image processing circuit 18, resize processing to the display size and the like for the HDR video frame generated in step S111 and generates electronic view finder display data. In step S115, the CPU 11 causes a display unit 13 to display the display data generated in step S114. That is, the live view image on the display unit 13 is updated.

In step S116, the CPU 11 determines whether the still image processing flag stored in the DRAM 15 is set to TRUE. Upon determining that the still image processing flag is not set to TRUE, the process advances to step S121. Upon determining that the still image processing flag is set to TRUE, the process advances to step S117. In step S117, the CPU 11 reads out the overexposed and underexposed still image frames stored in the DRAM 15 in steps S106 and S110 and composes them using the image processing circuit 18, thereby generating an HDR still image frame having a high dynamic range. In step S118, the CPU 11 compression-codes the HDR still image frame generated in step S117 into still image data of JPEG format using the still image compression circuit 21. In step S119, the CPU 11 records the still image data compression-coded in step S118 in the recording medium 20 via the recording medium interface 16. In step S120, since the series of still image processes according to the still image shooting instruction in step S101 has ended, the CPU 11 sets the still image processing flag to FALSE (for example, 0) and stores it in the DRAM 15.

In step S121, the CPU 11 determines whether a video recording stop instruction is input by operating the video recording button of the operation unit 14. Upon determining that no video recording stop instruction is input, the CPU 11 returns to step S101 to continue processing of the next video frame. Upon determining that the video recording stop instruction is input, the CPU 11 ends the HDR video recording.

A summary of the above-described processing will be given. In this embodiment, the CPU 11 performs processing of generating an HDR video frame having a high dynamic range by generating and composing a plurality of video frames under different exposure conditions and recording it in the recording medium as an HDR video. The image capturing apparatus 10 can accept a still image shooting instruction during the HDR video processing. In accordance with the acceptance of the still image shooting instruction, the CPU 11 generates an HDR still image frame during the HDR video processing and records it in the recording medium as an HDR still image. In this embodiment, the CPU 11 generates a plurality of video frames from a plurality of frames including a frame captured under a first exposure condition and a subsequent frame captured under a second exposure condition. In addition, the CPU 11 generates a plurality of still image frames from a plurality of frames including a frame captured under the first exposure condition, which is obtained first after acceptance of a still image shooting instruction, and a subsequent frame captured under the second exposure condition. When the still image shooting instruction is accepted during HDR video recording, an HDR still image generated from the same set of overexposed and underexposed images as that used to generate an HDR video frame can thus be recorded while continuing the HDR video recording.

In this embodiment, an example has been explained in which overexposed and underexposed images are converted into YUV data and then composed to generate an HDR image. However, overexposed and underexposed images of raw data format output from the image capturing unit may be composed and then converted into YUV data.

In this embodiment, an example has been explained in which two overexposed and underexposed images are composed to generate an HDR image. However, the number of images to be composed may be increased, and for example, three overexposed, underexposed, and properly exposed images may be composed to generate an HDR image.

Second Embodiment

An image capturing apparatus 10 can generate and record an HDR video by composing a plurality of images continuously captured while changing the exposure time. The image capturing apparatus 10 can also accept a still image shooting instruction by an operation of an operation unit 14 during HDR video recording and shoot an HDR still image while continuing the HDR video recording. The shooting time lag at that time can be shortened.

Figure 5:
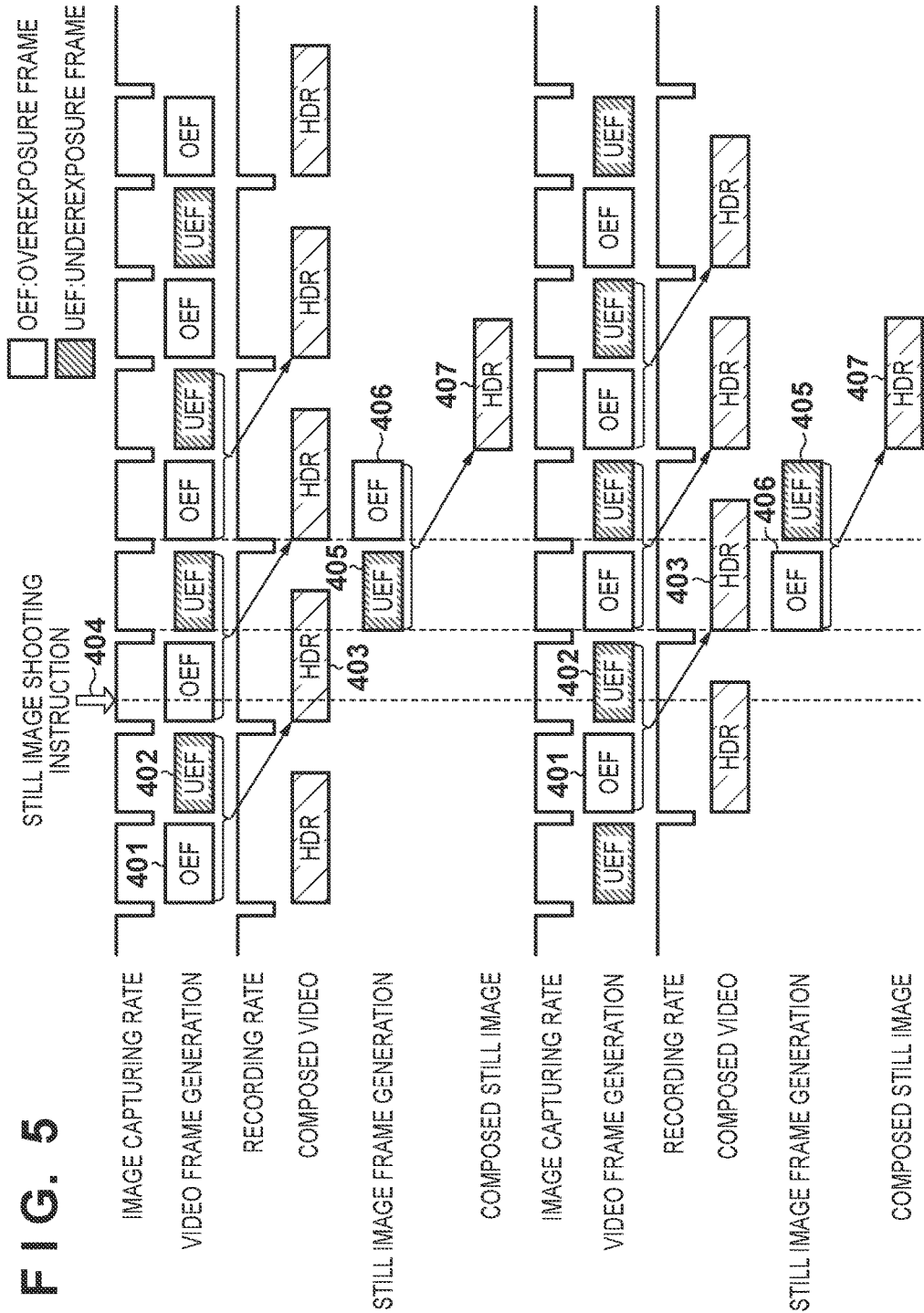
FIG. 5 is an operation timing chart of an image capturing apparatus according to another embodiment.

FIG. 5 shows an example of the operation timing of the image capturing apparatus 10. An image capturing unit 17 performs image capturing while alternately changing the exposure time. An image processing circuit 18 repetitively generates an overexposed video frame 401 and an underexposed video frame 402. When a set of overexposed and underexposed video frames is obtained, the image processing circuit 18 composes the overexposed and underexposed video frames and generates an HDR video frame 403 having an expanded dynamic range. A video compression circuit 19 compression-codes the continuous HDR video frames and records them in a recording medium 20 as an HDR video.

Upon accepting a still image shooting instruction 404 by an operation of the operation unit 14 during the HDR video recording, the image processing circuit 18 performs the following processing. That is, the image processing circuit 18 generates an underexposed still image frame 405 or an overexposed still image frame 406 from a frame next to the frame where the still image shooting instruction 404 has been accepted while generating the video frame. The image processing circuit 16 also generates the overexposed still image frame 406 or the underexposed still image frame 405 from the frame after the next. When a set of overexposed and underexposed still image frames is obtained, the image processing circuit 18 composes the overexposed and underexposed still image frames and generates an HDR still image frame 407 having an expanded dynamic range. A still image compression circuit 21 compression-codes the HDR still image frame and records it in the recording medium 20 as an HDR still image.

An HDR still image frame is thus generated by composing the first and second frames next to the frame that has accepted the still image shooting instruction and recorded. This can shorten the shooting time lag, although the same set as that used to generate an HDR video frame is not necessarily used.

Figure 6B:
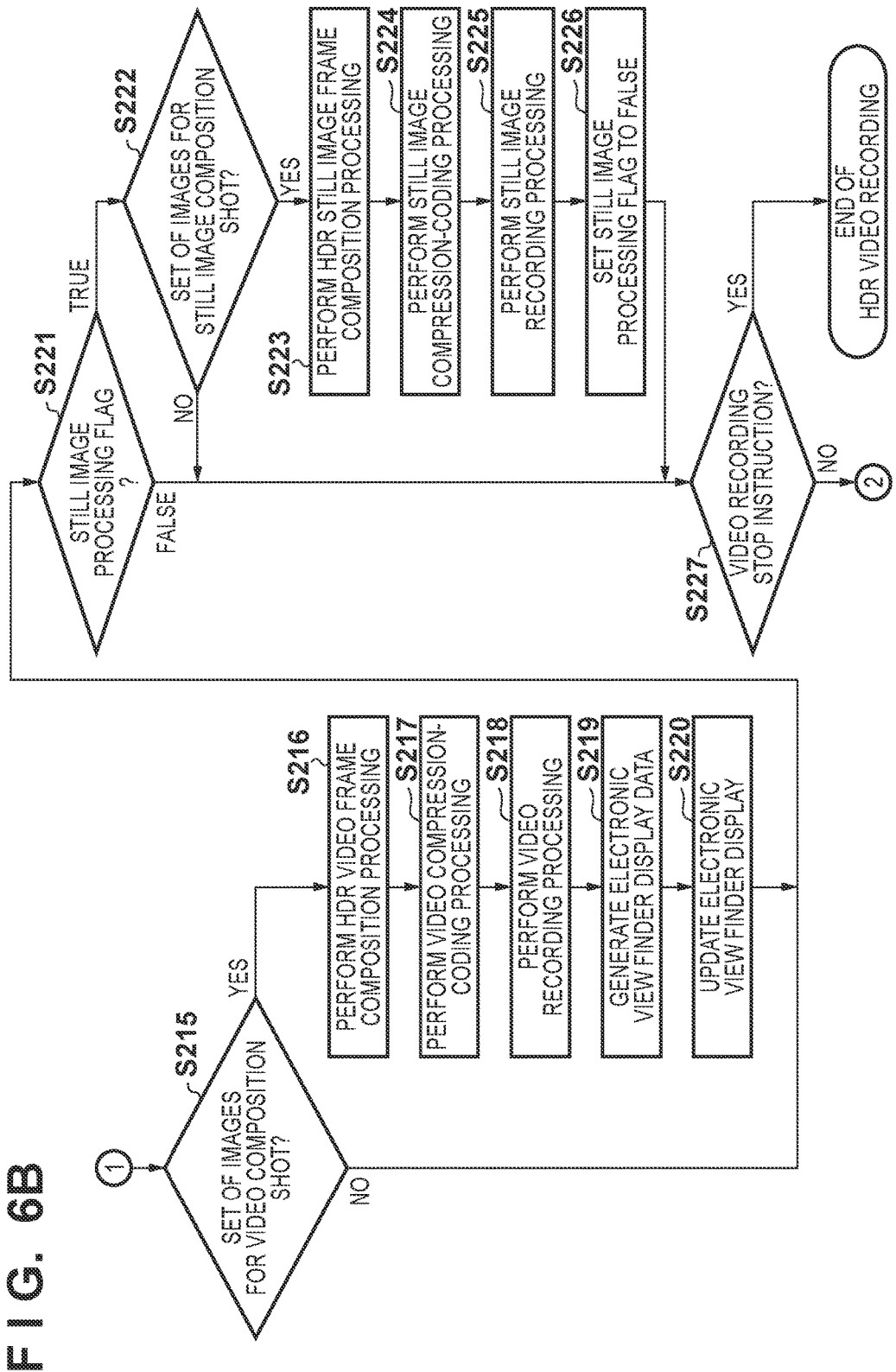

FIGS. 6A to 6B show the operation flowcharts of the image capturing apparatus 10. A CPU 11 controls the units so as to implement the operation shown in FIGS. 6A to 6B. When an HDR video recording start instruction is input by pressing the video recording button of the operation unit 14, the sequence shown in FIGS. 6A to 6B starts. In step S201, the CPU 11 sets the exposure of the next frame to overexposure and stores the setting on a DRAM 15. The exposure setting is used to determine whether to shoot an overexposed image or an underexposed image in the subsequent sequence. In step S202, the CPU 11 determines whether the user has input a still image shooting instruction by operating a release switch SW2 of the operation unit 14. Upon determining that no still image shooting instruction is input, the process advances to step S204. Upon determining that the still image shooting instruction is input, the CPU 11 sets a still image processing flag to TRUE (for example, 1) and stores it in the DRAM 15 in step S203. The still image processing flag is used to determine whether to perform still image processing in the subsequent sequence.

In step S204, the CPU 11 determines whether the exposure setting stored in the DRAM 15 is overexposure setting or underexposure setting. Upon determining that the exposure setting is overexposure setting, the process advances to step S205. Upon determining that the exposure setting is underexposure setting, the process advances to step S210. In step S205, the CPU 11 causes the image capturing unit 17 to shoot an overexposed image as compared to proper exposure. In step S206, the CPU 11 performs, using the image processing circuit 18, conversion processing to YUV data, resize processing to the video recording size, and the like for the overexposed image shot in step S205, generates an overexposed video frame, and stores it in the DRAM 15. In step S207, the CPU 11 determines whether the still image processing flag stored in the DRAM 15 is set to TRUE. Upon determining that the still image processing flag is not set to TRUE, the process advances to step S209. Upon determining that the still image processing flag is set to TRUE, the process advances to step S208. In step S208, the CPU 11 performs, using the image processing circuit 18, conversion processing to YUV data and the like for the overexposed image shot in step S205, generates an overexposed still image frame, and stores it in the DRAM 15. In step S209, the CPU 11 sets the exposure of the next frame to underexposure and stores the setting in the DRAM 15. After that, the process advances to step S215.

In step S210, the CPU 11 causes the image capturing unit 17 to shoot an underexposed image as compared to proper exposure. In step S211, the CPU 11 performs, using the image processing circuit 18, conversion processing to YUV data, resize processing to the video recording size, and the like for the underexposed image shot in step S210, generates an underexposed video frame, and stores it in the DRAM 15. In step S212, the CPU 11 determines whether the still image processing flag stored in the DRAM 15 is set to TRUE. Upon determining that the still image processing flag is not set to TRUE, the process advances to step S214. Upon determining that the still image processing flag is set to TRUE, the process advances to step S213. In step S213, the CPU 11 performs, using the image processing circuit 18, conversion processing to YUV data and the like for the underexposed image shot in step S210, generates an underexposed still image frame, and stores it in the DRAM 15. In step S214, the CPU 11 sets the exposure of the next frame to overexposure and stores the setting in the DRAM 15. After that, the process advances to step S215.

In step S215, the CPU 11 determines whether overexposed and underexposed video frames are stored in the DRAM 15 in steps S206 and S211, and one complete set of overexposed and underexposed video frames exists. Upon determining that one complete set of overexposed and underexposed video frames does not exist, the process advances to step S221. Upon determining that one complete set of overexposed and underexposed video frames exists, the process advances to step S216.

In step S216, the CPU 11 reads out a set of overexposed and underexposed video frames stored in the DRAM 15 in steps S206 and S211 and composes them using the image processing circuit 18, thereby generating an HDR video frame having an expanded dynamic range. In step S217, the CPU 11 compression-codes the HDR video frame generated in step S216 into video data of H.264 format or the like using the video compression circuit 19. In step S218, the CPU 11 records the video data compression-coded in step S217 in the recording medium 20 via a recording medium interface 16. In step S219, the CPU 11 performs, using the image processing circuit 18, resize processing to the display size and the like for the HDR video frame generated in step S216 and generates electronic view finder display data. In step S220, the CPU 11 causes a display unit 13 to display the display data generated in step S219. That is, the live view image on the display unit 13 is updated.

In step S221, the CPU 11 determines whether the still image processing flag stored in the DRAM 15 set to TRUE. Upon determining that the still image processing flag is not set to TRUE, the process advances to step S227. Upon determining that the still image processing flag is set to TRUE, the process advances to step S222. In step S222, the CPU 11 determines whether overexposed and underexposed still image frames are stored in the DRAM 15 in steps S208 and S213, and one complete set of overexposed and underexposed still image frames exists. Upon determining that one complete set of overexposed and underexposed still image frames does not exist, the process advances to step S227. Upon determining that one complete set of overexposed and underexposed still image frames exists, the process advances to step S223.

In step S223, the CPU 11 reads out the overexposed and underexposed still image frames stored in the DRAM 15 in steps S208 and S213 and composes them using the image processing circuit 18, thereby generating an HDR still image frame having an expanded dynamic range. In step S224, the CPU 11 compression-codes the HDR still image frame generated in step S223 into still image data of JPEG format using the still image compression circuit 21. In step S225, the CPU 11 records the still image data compression-coded in step S224 in the recording medium 20 via the recording medium interface 16. In step S226, since the series of still image processes according to the still image shooting instruction in step S202 has ended, the CPU 11 sets the still image processing flag to FALSE (for example, 0) and stores it in the DRAM 15.

In step S227, the CPU 11 determines whether a video recording stop instruction is input by operating the video recording button of the operation unit 14. Upon determining that no video recording stop instruction is input, the CPU 11 returns to step S202 to continue processing of the next video frame. Upon determining that the video recording stop instruction is input, the CPU 11 ends the HDR video recording.

As described above, in this embodiment, the CPU 11 generates a plurality of video frames from a plurality of frames including a frame captured under a first exposure condition and a subsequent frame captured under a second exposure condition. In addition, the CPU 11 generates a plurality of still image frames from a plurality of frames including a frame immediately after acceptance of a still image shooting instruction and a subsequent frame. This can shorten the HDR still image frame shooting time lag as compared to control processing of the first embodiment.

In this embodiment, an example has been explained in which overexposed and underexposed images are converted into YUV data and then composed to generate an HDR image. However, overexposed and underexposed images of raw data format output from the image capturing unit may be composed and then converted into YUV data.

In this embodiment, an example has been explained in which two overexposed and underexposed images are composed to generate an HDR image. However, the number of images to be composed may be increased, and for example, three overexposed, underexposed, and properly exposed images may be composed to generate an HDR image.

Third Embodiment

An image capturing apparatus 10 can generate and record an HDR video by composing a plurality of images continuously captured while changing the exposure time. The image capturing apparatus 10 can also accept a still image shooting instruction by an operation of an operation unit 14 during HDR video recording and shoot an HDR still image while continuing the HDR video recording. The shooting time lag at that time can be shortened.

Figure 7:
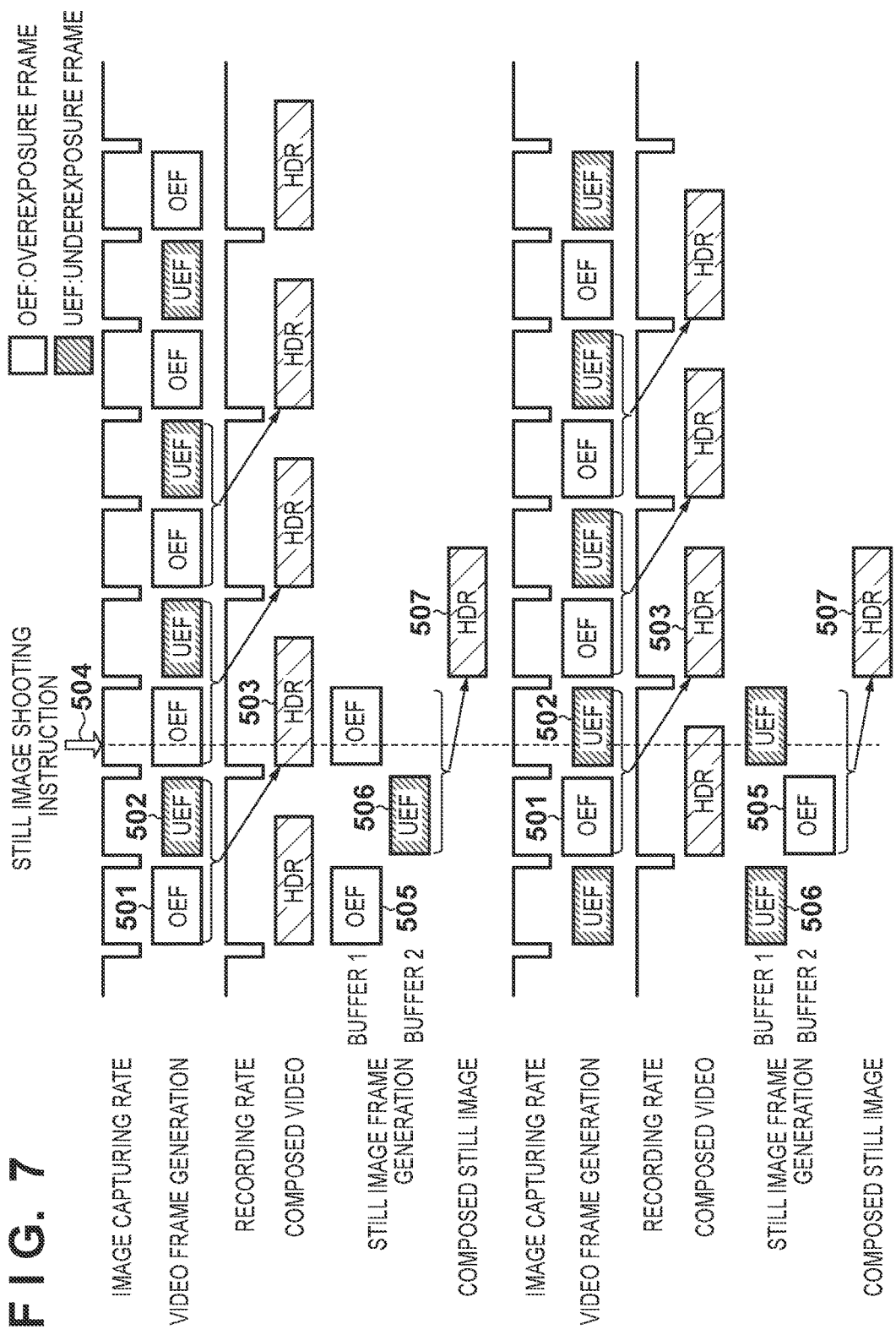
FIG. 7 is an operation timing chart of an image capturing apparatus according to still another embodiment.

FIG. 7 shows an example of the operation timing of the image capturing apparatus 10. An image capturing unit 17 performs image capturing while alternately changing the exposure time. An image processing circuit 18 repetitively generates an overexposed video frame 501 and an underexposed video frame 502. When a set of overexposed and underexposed video frames is obtained, the image processing circuit 18 composes the overexposed and underexposed video frames and generates an HDR video frame 503 having an expanded dynamic range. A video compression circuit 19 compression-codes the continuous HDR video frames and records them in a recording medium 20 as an HDR video.

At this time, an overexposed still image frame 505 and an underexposed still image frame 506 are also repetitively generated and stored in the buffers of a DRAM 15 at the same time as the video frame generation. At this time, buffer capacities for at least two images necessary for composition processing are allocated in the DRAM 15 so as to store one generated overexposed still image frame and one generated underexposed still image frame, respectively. When an overexposed still image frame or underexposed still image frame is newly generated, the previously stored overexposed still image frame or underexposed still image frame is overwritten.

Upon accepting a still image shooting instruction 504 by an operation of the operation unit 14 during the HDR video recording, the image processing circuit 18 performs the following processing. That is, the image processing circuit 18 waits for generation of the overexposed still image frame or underexposed still image frame of a frame where the still image shooting instruction has been accepted and obtaining of a set of still image frames. When a set of overexposed and underexposed still image frames is obtained, the image processing circuit 18 composes the set of overexposed and underexposed still image frames and generates an HDR still image frame 507 having an expanded dynamic range. A still image compression circuit 21 compression-codes the HDR still image frame and records it in the recording medium 20 as an HDR still image.

When the still image frame is also thus repetitively generated and stored in the buffer at the same time as the video frame generation, an HDR still image frame can be generated by composing a frame where the still image shooting instruction has been accepted and an immediately preceding frame stored in the buffer, and recorded. This can shorten the shooting time lag, although the processing load and power consumption increase because the still image frame is always generated.

Figure 8A:
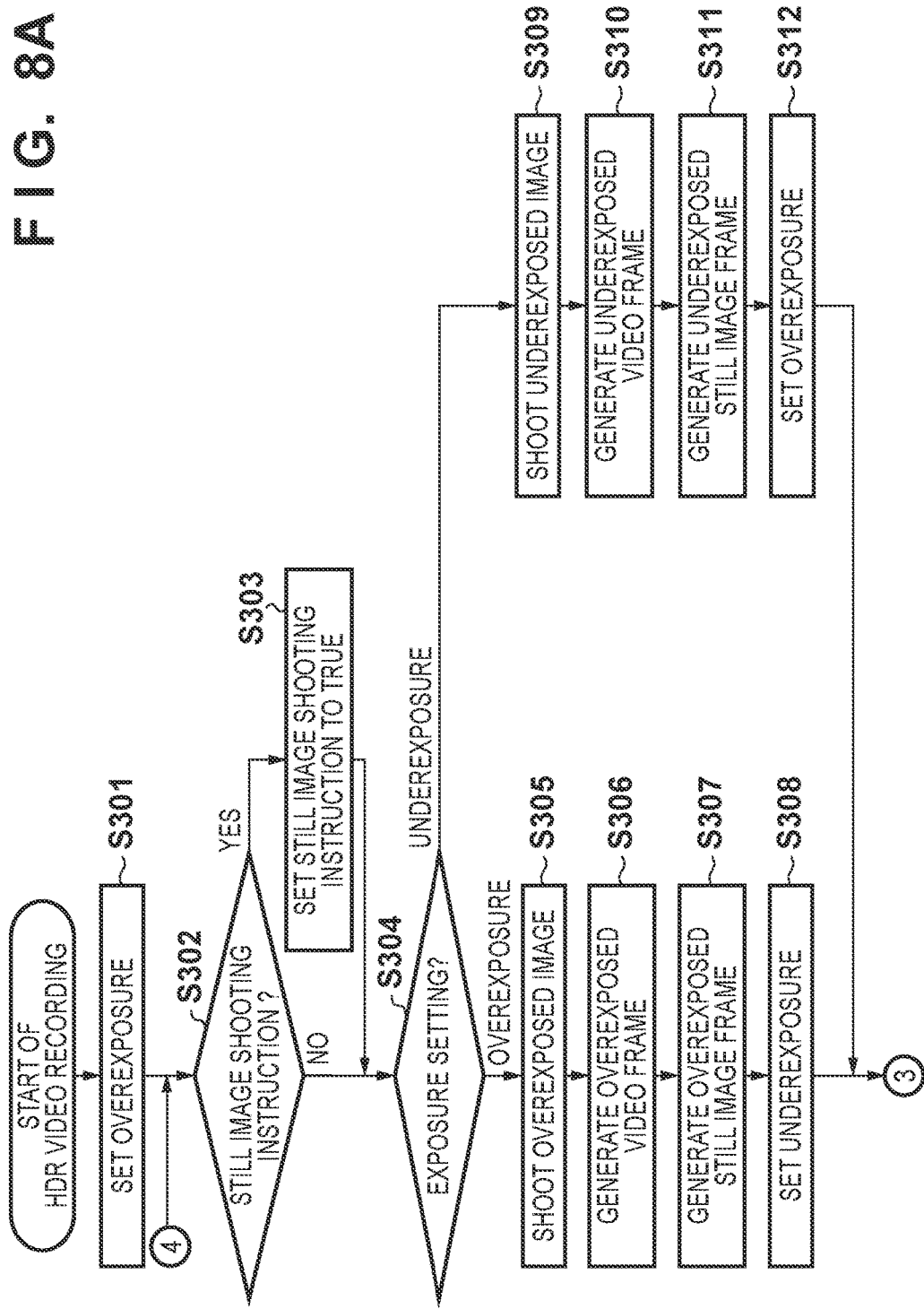

FIGS. 8A to 8B show the operation flowcharts of the image capturing apparatus 10. A CPU 11 controls the units so as to implement the operation shown in FIGS. 8A to 8B. When an HDR video recording start instruction is input by pressing the video recording button of the operation unit 14, the sequence shown in FIGS. 8A to 8B starts. In step S301, the CPU 11 sets the exposure of the next frame to overexposure and stores the setting in the DRAM 15. The exposure setting is used to determine whether to shoot an overexposed image or an underexposed image in the subsequent sequence. In step S302, the CPU 11 determines whether the user has input a still image shooting instruction by operating a release switch SW2 of the operation unit 14. Upon determining that no still image shooting instruction is input, the process advances to step S304. Upon determining that the still image shooting instruction is input, the CPU 11 sets a still image processing flag to TRUE (for example, 1) and stores it in the DRAM 15 in step S303. The still image processing flag is used to determine whether to perform still image processing in the subsequent sequence. In step S304, the CPU 11 determines whether the exposure setting stored in the DRAM 15 is overexposure setting or underexposure setting. Upon determining that the exposure setting is overexposure setting, the process advances to step S305. Upon determining that the exposure setting is underexposure setting, the process advances to step S309. In step S305, the CPU 11 causes the image capturing unit 17 to shoot an overexposed image as compared to proper exposure. In step S306, the CPU 11 performs, using the image processing circuit 18, conversion processing to YUV data, resize processing to the video recording size, and the like for the overexposed image shot in step S305, generates an overexposed video frame, and stores it in the DRAM 15. In step S307, the CPU 11 performs, using the image processing circuit 18, conversion processing to YUV data and the like for the overexposed image shot in step S305, generates an overexposed still image frame, and stores it in the buffer of the DRAM 15. In step S308, the CPU 11 sets the exposure of the next frame to underexposure and stores the setting in the DRAM 15. After that, the process advances to step S313.

In step S309, the CPU 11 causes the image capturing unit 17 to shoot an underexposed image as compared to proper exposure. In step S310, the CPU 11 performs, using the image processing circuit 18, conversion processing to YUV data, resize processing to the video recording size, and the like for the underexposed image shot in step S309, generates an underexposed video frame, and stores it in the DRAM 15. In step S311, the CPU 11 performs, using the image processing circuit 18, conversion processing to YUV data and the like for the underexposed image shot in step S309, generates an underexposed still image frame, and stores it in the buffer of the DRAM 15. In step S312, the CPU 11 sets the exposure of the next frame to overexposure and stores the setting in the DRAM 15. After that, the process advances to step S313.

In step S313, the CPU 11 determines whether overexposed and underexposed video frames are stored in the DRAM 15 in steps S306 and S310, and one complete set of overexposed and underexposed video frames exists. Upon determining that one complete set of overexposed and underexposed video frames does not exist, the process advances to step S319. Upon determining that one complete set of overexposed and underexposed video frames exists, the process advances to step S314. In step S314, the CPU 11 reads out a set of overexposed and underexposed video frames stored in the DRAM 15 in steps S306 and S310 and composes them using the image processing circuit 18, thereby generating an HDR video frame having an expanded dynamic range. In step S315, the CPU 11 compression-codes the HDR video frame generated in step S314 into video data of H.264 format or the like using the video compression circuit 19. In step S316, the CPU 11 records the video data compression-coded in step S315 in the recording medium 20 via a recording medium interface 16. In step S317, the CPU 11 performs, using the image processing circuit 18, resize processing to the display size and the like for the HDR video frame generated in step S315 and generates electronic view finder display data. In step S318, the CPU 11 causes a display unit 13 to display the display data generated in step S317. That is, the live view image on the display unit 13 is updated.

In step S319, the CPU 11 determines whether the still image processing flag stored in the DRAM 15 is set to TRUE. Upon determining that the still image processing flag is not set to TRUE, the process advances to step S324. Upon determining that the still image processing flag is set to TRUE, the process advances to step S320. In step S320, the CPU 11 reads out the overexposed and underexposed still image frames stored in the buffer of the DRAM 15 in steps S307 and S311 and composes them using the image processing circuit 18, thereby generating an HDR still image frame having an expanded dynamic range. At this time, the frame where the still image shooting instruction has been accepted and the immediately preceding frame stored in the buffer are used for composition. In step S321, the CPU 11 compression-codes the HDR still image frame generated in step S320 into still image data of JPEG format using the still image compression circuit 21. In step S322, the CPU 11 records the still image data compression-coded in step S321 in the recording medium 20 via the recording medium interface 16. In step S323, since the series of still image processes according to the still image shooting instruction in step S302 has ended, the CPU 11 sets the still image processing flag to FALSE (for example, 0) and stores it in the DRAM 15.

In step S324, the CPU 11 determines whether a video recording stop instruction is input by operating the video recording button of the operation unit 14. Upon determining that no video recording stop instruction is input, the CPU 11 returns to step S302 to continue processing of the next video frame. Upon determining that the video recording stop instruction is input, the CPU 11 ends the HDR video recording.

As described above, in this embodiment, every time a plurality of video frames are generated, the CPU 11 generates a plurality of corresponding still image frames. A buffer temporarily stores the plurality of generated still image frames. Upon accepting a still image shooting instruction, the CPU 11 uses a still image frame generated in the current frame and the still image frame of an immediately preceding frame read out from the buffer. This can shorten the shooting time lag at that time, although the processing load and power consumption increase.

In this embodiment, an example has been explained in which overexposed and underexposed images are converted into YUV data and then composed to generate an HDR image. However, overexposed and underexposed images of raw data format output from the image capturing unit may be composed and then converted into YUV data.

In this embodiment, an example has been explained in which two overexposed and underexposed images are composed to generate an HDR image. However, the number of images to be composed may be increased, and for example, three overexposed, underexposed, and properly exposed images may be composed to generate an HDR image.

Fourth Embodiment

An image capturing apparatus 10 can generate and record an HDR video by composing a plurality of images continuously captured while changing the exposure time. The image capturing apparatus 10 can also accept a still image shooting instruction by an operation of an operation unit 14 during HDR video recording and shoot an HDR still image while continuing the HDR video recording. The shooting time lag at that time can be eliminated.

Figure 9:
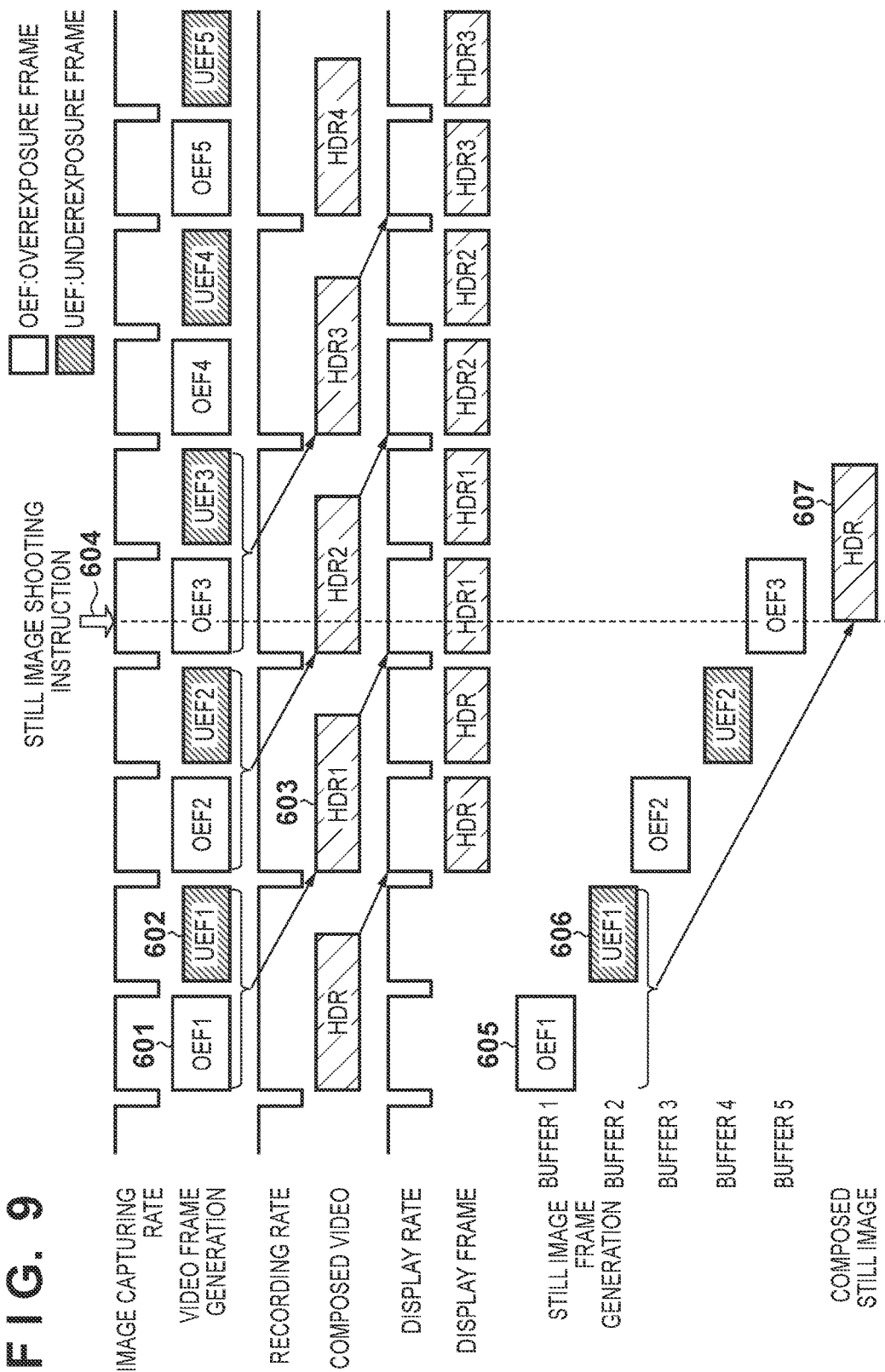
FIG. 9 is an operation timing chart of an image capturing apparatus according to still another embodiment.

FIG. 9 shows an example of the operation timing of the image capturing apparatus 10. An image capturing unit 17 performs image capturing while alternately changing the exposure time. An image processing circuit 18 repetitively generates an overexposed video frame 601 and an underexposed video frame 602. When a set of overexposed and underexposed video frames is obtained, the image processing circuit 18 composes the overexposed and underexposed video frames and generates an HDR video frame 603 having an expanded dynamic range. A video compression circuit 19 compression-codes the continuous HDR video frames and records them in a recording medium 20 as an HDR video. At this time, an overexposed still image frame 605 and an underexposed still image frame 606 are also repetitively generated and stored in the buffers of DRAM 15 at the same time as the video frame generation. At this time, buffer areas capable of storing frames up to a set of overexposed and underexposed still image frames used to generate an HDR composed image displayed on a display unit 13 when a still image shooting instruction is input are allocated in the DRAM 15. When the view finder display on the display unit 13 is updated, the set of overexposed and underexposed still image frames used to generate the displayed HDR composed image becomes unnecessary and can therefore be overwritten by newly generated overexposed and underexposed still image frames.

Upon accepting a still image shooting instruction 604 by an operation of the operation unit 14 during the HDR video recording, the image processing circuit 18 composes a set of overexposed and underexposed still image frames and generates an HDR still image frame 607 having an expanded dynamic range. At this time, a set of overexposed and underexposed still image frames used to generate an HDR composed image displayed on the display unit 13 and stored in the buffers are used for the composition. A still image compression circuit 21 compression-codes the HDR still image frame and records it in the recording medium 20 as an HDR still image.

The still image frame is also thus repetitively generated and stored in the buffer at the same time as the video frame generation. This makes it possible to generate and record an HDR still image frame by composing the same set of overexposed and underexposed still image frames as that used to generate an HDR composed image displayed when a still image shooting instruction has been accepted. This can eliminate the shooting time lag, although the processing load and power consumption increase because the still image frame is always generated, and the buffer capacity necessary to store the same frames as those used to generate the HDR composed image that is being displayed also increases.

Figure 10:
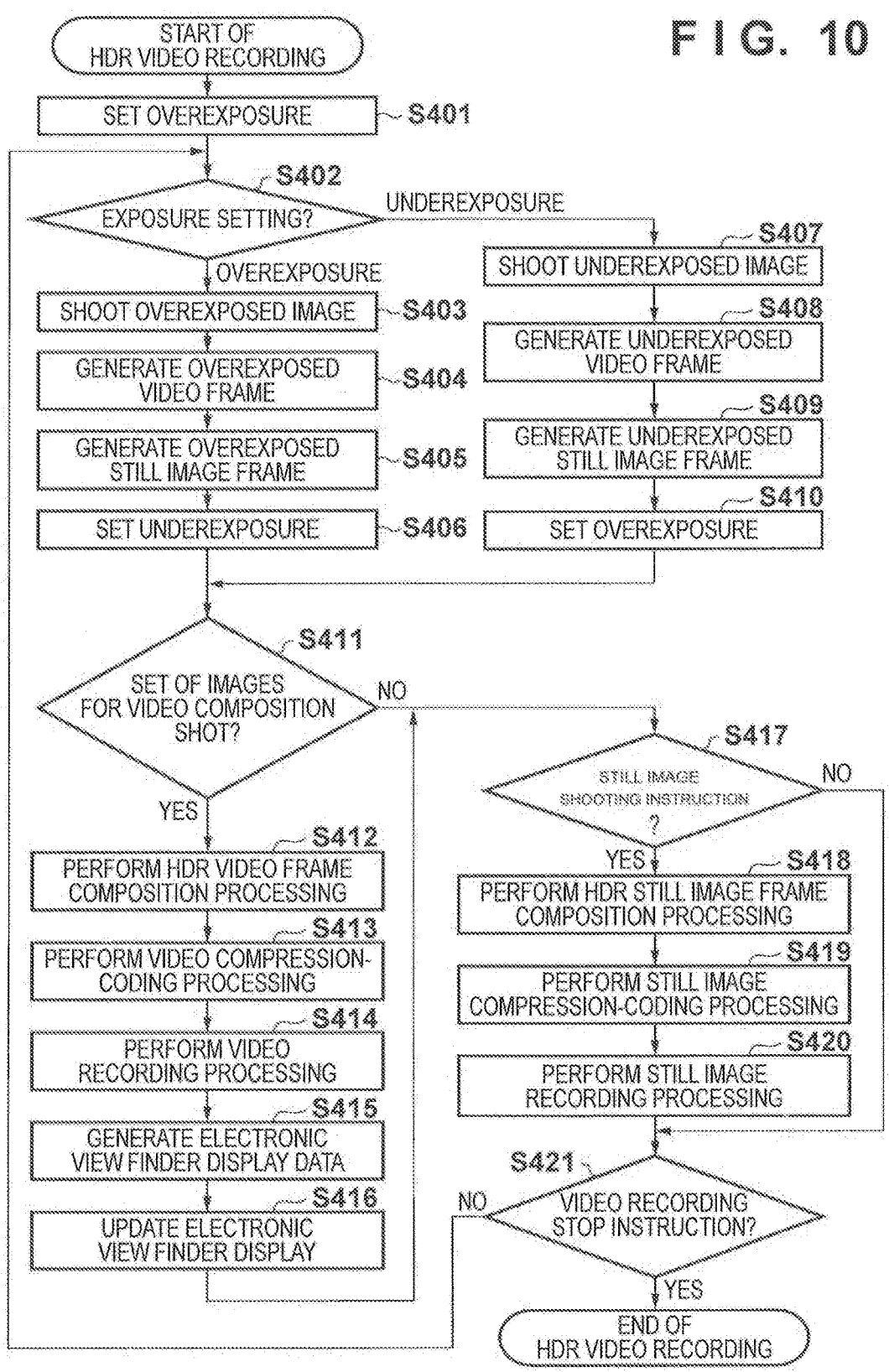
FIG. 10 is an operation flowchart of the image capturing apparatus according to the embodiment.

FIG. 10 shows the operation flowchart of the image capturing apparatus 10. A CPU 11 controls the units so as to implement the operation shown in FIG. 10. When an HDR video recording start instruction is input by pressing the video recording button of the operation unit 14, the sequence shown in FIG. 10 starts. In step S401, the CPU 11 sets the exposure of the next frame to overexposure and stores the setting in the DRAM 15. The exposure setting is used to determine whether to shoot an overexposed image or an underexposed image in the subsequent sequence. In step S402, the CPU 11 determines whether the exposure setting stored in the DRAM 15 is overexposure setting or underexposure setting. Upon determining that the exposure setting is overexposure setting, the process advances to step S403. Upon determining that the exposure setting is underexposure setting, the process advances to step S407. In step S403, the CPU 11 causes the image capturing unit 17 to shoot an overexposed image as compared to proper exposure. In step S404, the CPU 11 performs, using the image processing circuit 18, conversion processing to YUV data, resize processing to the video recording size, and the like for the overexposed image shot in step S403, generates an overexposed video frame, and stores it in the DRAM 15. In step S405, the CPU 11 performs, using the image processing circuit 18, conversion processing to YUV data and the like for the overexposed image shot in step S403, generates an overexposed still image frame, and stores it in the buffer of the DRAM 15. In step S406, the CPU 11 sets the exposure of the next frame to underexposure and stores the setting in the DRAM 15. After that, the process advances to step S411.

In step S407, the CPU 11 causes the image capturing unit 17 to shoot an underexposed image as compared to proper exposure. In step S408, the CPU 11 performs, using the image processing circuit 18, conversion processing to YUV data, resize processing to the video recording size, and the like for the underexposed image shot in step S407, generates an underexposed video frame, and stores it in the DRAM 15. In step S409, the CPU 11 performs, using the image processing circuit 18, conversion processing to YUV data and the like for the underexposed image shot in step S407, generates an underexposed still image frame, and stores it in the buffer of the DRAM 15. In step S410, the CPU 11 sets the exposure of the next frame to overexposure and stores the setting in the DRAM 15. After that, the process advances to step S411.

In step S411, the CPU 11 determines whether overexposed and underexposed video frames are stored in the DRAM 15 in steps S404 and S408, and one complete set of overexposed and underexposed video frames exists. Upon determining that one complete set of overexposed and underexposed video frames does not exist, the process advances to step S417. Upon determining that one complete set of overexposed and underexposed video frames exists, the process advances to step S412. In step S412, the CPU 11 reads out a set of overexposed and underexposed video frames stored in the DRAM 15 in steps S404 and S408 and composes them using the image processing circuit 18, thereby generating an HDR video frame having an expanded dynamic range. In step S413, the CPU 11 compression-codes the HDR video frame generated in step S412 into video data of H.264 format or the like using the video compression circuit 19. In step S414, the CPU 11 records the video data compression-coded in step S413 in the recording medium 20 via a recording medium interface 16. In step S415, the CPU 11 performs, using the image processing circuit 18, resize processing to the display size and the like for the HDR video frame generated in step S412 and generates electronic view finder display data. In step S416, the CPU 11 causes a display unit 13 to display the display data generated in step S415. That is, the live view image on the display unit 13 is updated.

In step S417, the CPU 11 determines whether the user has input a still image shooting instruction by operating a release switch SW2 of the operation unit 14. Upon determining that no still image shooting instruction is input, the process advances to step S421. Upon determining that the still image shooting instruction is input, the process advances to step S418. In step S418, the CPU 11 reads out the overexposed and underexposed still image frames stored in the buffer of the DRAM 15 in steps S405 and S409 and composes them using the image processing circuit 18, thereby generating an HDR still image frame having an expanded dynamic range. At this time, the same set of overexposed and underexposed still image frames as that used to generate the HDR composed image displayed on the display unit 13 when the still image shooting instruction has been accepted is used. In step S419, the CPU 11 compression-codes the HDR still image frame generated in step S418 into still image data of JPEG format using the still image compression circuit 21. In step S420, the CPU 11 records the still image data compression-coded in step S419 in the recording medium 20 via the recording medium interface 16.

In step S421, the CPU 11 determines whether a video recording stop instruction is input by operating the video recording stop button of the operation unit 14. Upon determining that no video recording stop instruction is input, the CPU 11 returns to step S402 to continue processing of the next video frame. Upon determining that the video recording stop instruction is input, the CPU 11 ends the HDR video recording.

As described above, in this embodiment, a plurality of still image frames corresponding to a plurality of video frames as the base of an HDR video displayed on the display unit at the point of time of accepting a still image shooting instruction are read out from the buffers and composed, thereby generating an HDR still image frame. This makes it possible to generate and record an HDR still image frame by composing the same set of overexposed and underexposed still image frames as that used to generate an HDR composed image displayed on the display unit 13 when a still image shooting instruction has been accepted. When the still image shooting instruction is accepted during HDR video recording, an HDR still image can be recorded while continuing the HDR video recording. In addition, the shooting time lag at that time can be eliminated, although the processing load and power consumption increase, and the necessary buffer capacity also increases.

In this embodiment, an example has been explained in which overexposed and underexposed images are converted into YUV data and then composed to generate an HDR image. However, overexposed and underexposed images of raw data format output from the image capturing unit may be composed and then converted into YUV data.

In this embodiment, an example has been explained in which two overexposed and underexposed images are composed to generate an HDR image. However, the number of images to be composed may be increased, and for example, three overexposed, underexposed, and properly exposed images may be composed to generate an HDR image.

In the above-described first to fourth embodiments, the HDR still image is generated at different timings with respect to HDR video generation. Since the necessary buffer capacity, calculation load, and the time lag from HDR still image shooting instruction to HDR still image generation have tradeoff relationships, one of the processes according to the embodiments may be selectable.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-189847, filed Sep. 12, 2013, which is hereby incorporated by reference herein in its entirety.

The invention claimed is:

1. An image capturing apparatus, comprising:
a first recording control unit configured to perform processing of generating an HDR video frame having a high dynamic range by generating video frames from a plurality of frames of different exposure conditions, composing the video frames, and recording the HDR video frames in a recording medium as an HDR video;
an accepting unit configured to accept a still image shooting instruction during the processing by the first recording control unit; and
a second recording control unit configured to generate, when the accepting unit accepts the still image shooting instruction during the processing by the first recording control unit, an HDR still image frame having a high dynamic range by generating a plurality of still image frames of different exposure conditions during the processing by the first recording control unit and composing the still image frames, and recording the HDR still image frame in a recording medium as an HDR still image;
wherein the image capturing apparatus has a mode in which the first recording control unit generates the plurality of video frames from the plurality of frames including a frame captured under a first exposure condition and a subsequent frame captured under a second exposure condition; and
the second recording control unit generates the plurality of still image frames from a plurality of frames including a frame immediately after acceptance of the still image shooting instruction, and a subsequent frame.

2. The apparatus according to claim 1, wherein the first recording control unit encodes the HDR video by a video encoding method and records the HDR video in the recording medium.

3. The apparatus according to claim 2, wherein the video encoding method is an encoding method complying with H.264.

4. The apparatus according to claim 2, wherein the video encoding method is an encoding method complying with H.265.

5. The apparatus according to claim 1, wherein the second recording control unit encodes the HDR still image by a still image encoding method and records the HDR still image in the recording medium.

6. The apparatus according to claim 5, wherein the still image encoding method is an encoding method complying with JPEG.

7. The apparatus according to claim 1, wherein the number of pixels per frame is larger in the HDR still image than in the HDR video.

8. The apparatus according to claim 1, wherein the image capturing apparatus has a plurality of modes in which the second recording control unit has different operations, and which one of the plurality of modes is to be used to operate is selectable.

9. An image capturing apparatus, comprising:
a first recording control unit configured to perform processing of generating an HDR video frame having a high dynamic range by generating video frames from a plurality of frames of different exposure conditions and composing the video frames, and recording the HDR video frames in a recording medium as an HDR video;
an accepting unit configured to accept a still image shooting instruction during the processing by the first recording control unit; and
a second recording control unit configured to generate, when the accepting unit accepts the still image shooting instruction during the processing by the first recording control unit, an HDR still image frame having a high dynamic range by generating a plurality of still image frames of different exposure conditions during the processing by the first recording control unit and composing the still image frames, and recording the HDR still image frame in a recording medium as an HDR still image;
wherein the image capturing apparatus has a mode in which the first recording control unit generates the plurality of video frames from the plurality of frames including a frame captured under a first exposure condition and a subsequent frame captured under a second exposure condition, and in accordance with acceptance of the still image shooting instruction, the second recording control unit generates a plurality of still image frames from a plurality of frames independently of a combination of the video frames used to generate the HDR video frame.

10. The apparatus according to claim 9, wherein the first recording control unit encodes the HDR video by a video encoding method and records the HDR video in the recording medium.

11. The apparatus according to claim 10, wherein the video encoding method is an encoding method complying with H.264.

12. The apparatus according to claim 10, wherein the video encoding method is an encoding method complying with H.265.

13. The apparatus according to claim 9, wherein the second recording control unit encodes the HDR still image by a still image encoding method and records the HDR still image in the recording medium.

14. The apparatus according to claim 13, wherein the still image encoding method is an encoding method complying with JPEG.

15. The apparatus according to claim 9, wherein the number of pixels per frame is larger in the HDR still image than in the HDR video.

16. The apparatus according to claim 9, wherein the image capturing apparatus has a plurality of modes in which the second recording control unit has different operations, and which one of the plurality of modes is to be used to operate is selectable.

* * * * *